(12) United States Patent
Sathyanarayana et al.

(10) Patent No.: US 12,459,129 B2
(45) Date of Patent: Nov. 4, 2025

(54) METHOD FOR MOTION OPTIMIZED DEFECT INSPECTION BY A ROBOTIC ARM USING PRIOR KNOWLEDGE FROM PLM AND MAINTENANCE SYSTEMS

(71) Applicant: HITACHI, Ltd., Tokyo (JP)

(72) Inventors: Supriya Sathyanarayana, Milpitas, CA (US); Joydeep Acharya, Milpitas, CA (US)

(73) Assignee: Hitachi, Ltd., Tokyo (JP)

( * ) Notice: Subject to any disclaimer, the term of this patent is extended or adjusted under 35 U.S.C. 154(b) by 206 days.

(21) Appl. No.: 18/221,769

(22) Filed: Jul. 13, 2023

(65) Prior Publication Data

US 2025/0018576 A1  Jan. 16, 2025

(51) Int. Cl.
*B25J 9/16* (2006.01)
*G06T 7/00* (2017.01)

(52) U.S. Cl.
CPC ........... *B25J 9/1697* (2013.01); *B25J 9/1664* (2013.01); *G06T 7/0004* (2013.01); *B25J 9/163* (2013.01); *B25J 9/1653* (2013.01); *B25J 9/1682* (2013.01)

(58) Field of Classification Search
CPC ..... B25J 9/1697; B25J 9/1664; G06T 7/0004; G06T 2207/20081; G06T 7/001; G06T 2207/30164
See application file for complete search history.

(56) References Cited

U.S. PATENT DOCUMENTS

| | | | |
|---|---|---|---|
| 2002/0009220 A1* | 1/2002 | Tanaka | G06T 7/0002 382/150 |
| 2004/0172164 A1* | 9/2004 | Habibi | G06T 1/0007 700/245 |
| 2014/0267691 A1* | 9/2014 | Humphrey | G06T 7/001 348/125 |
| 2017/0124692 A1* | 5/2017 | Yoshida | G06T 7/0004 |
| 2018/0211373 A1* | 7/2018 | Stoppa | G06T 7/55 |
| 2019/0272630 A1* | 9/2019 | Inazumi | G06T 7/0008 |
| 2019/0289174 A1* | 9/2019 | Ishii | H04N 23/67 |

(Continued)

FOREIGN PATENT DOCUMENTS

CN  115184359 A  * 10/2022
CN  115222278 A  * 10/2022

(Continued)

*Primary Examiner* — Truc M Do
*Assistant Examiner* — Tyler Roger Robarge
(74) *Attorney, Agent, or Firm* — PROCOPIO, CORY, HARGREAVES & SAVITCH LLP

(57) ABSTRACT

A method for object defect detection. The method may include receiving an object on a production line; computing, by a processor, a motion optimized path for a robot arm, wherein the motion optimized path comprises a path for performing a sequence of rotations by the robot arm on the object for image capturing; using the robot arm to grasp the object and moving the robot arm according to the motion optimized path to rotate the object based on the sequence of rotations; capturing, by a camera, a plurality of images of the object while the object is being rotated; performing, by the processor, defect detection on the plurality of images of the object to determine object defect; and for object defect being detected, issuing, by the processor, a defect notification to an operator of the production line.

17 Claims, 13 Drawing Sheets

(56) References Cited

U.S. PATENT DOCUMENTS

| | | | |
|---|---|---|---|
| 2021/0150700 A1* | 5/2021 | Wang | G06F 18/2415 |
| 2022/0092765 A1* | 3/2022 | Song | G06T 7/0004 |
| 2022/0405506 A1* | 12/2022 | Taamazyan | B25J 15/0608 |
| 2023/0063601 A1* | 3/2023 | Upadhyay | G07C 5/006 |
| 2023/0182315 A1* | 6/2023 | Merkle | B25J 9/1669 |
| | | | 700/259 |
| 2023/0364787 A1* | 11/2023 | Cygan | B25J 9/163 |
| 2024/0160194 A1* | 5/2024 | Bakhshmand | G06N 3/0464 |
| 2024/0335943 A1* | 10/2024 | Bodily | B25J 9/1684 |

FOREIGN PATENT DOCUMENTS

| | | | |
|---|---|---|---|
| JP | 2013167988 A | * | 8/2013 |
| JP | 2022147597 A | * | 10/2022 |
| KR | 20160078617 A | * | 7/2016 |
| WO | WO-2024161891 A1 | * | 8/2024 |

* cited by examiner

| Part ID 902 | Defect ID 904 | Bounding box coordinates 906 | Centroid 908 | Spread 910 | Probability 912 |
|---|---|---|---|---|---|
| 1 | Defect 1 | x,y,w,h | | | |
| | Defect 2 | | | | |
| | Defect 3 | | | | |
| 2 | Defect 1 | | | | |
| | Defect 2 | | | | |
| ... | ... | | | | |

FIG. 9

Part with defects:
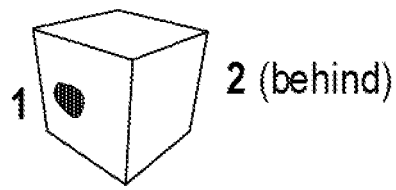
Sequence of rotations:
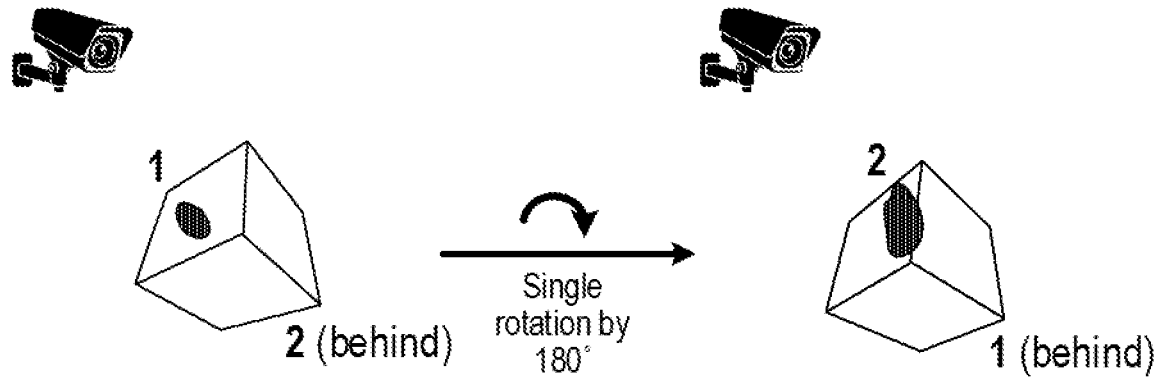
FIG. 11(A)
Part with defects:
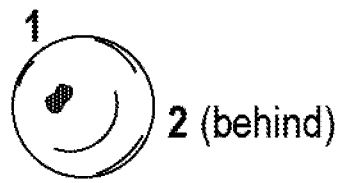
Sequence of rotations:
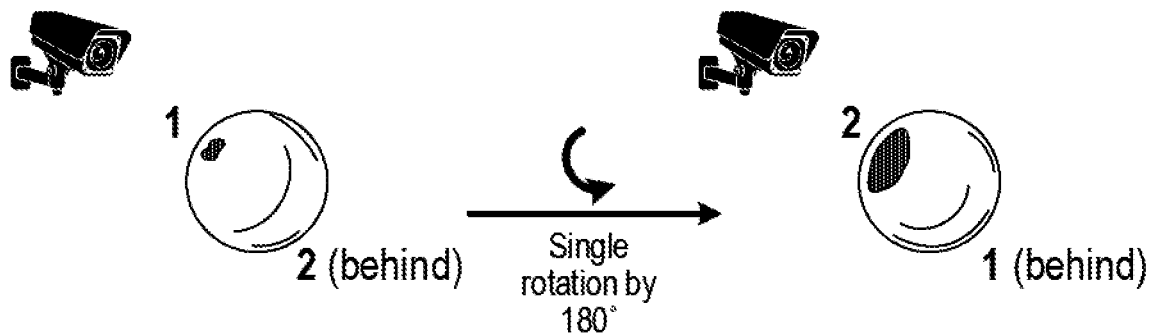
FIG. 11(B)

Part with defects:
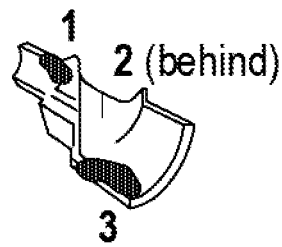
Sequence of rotations:
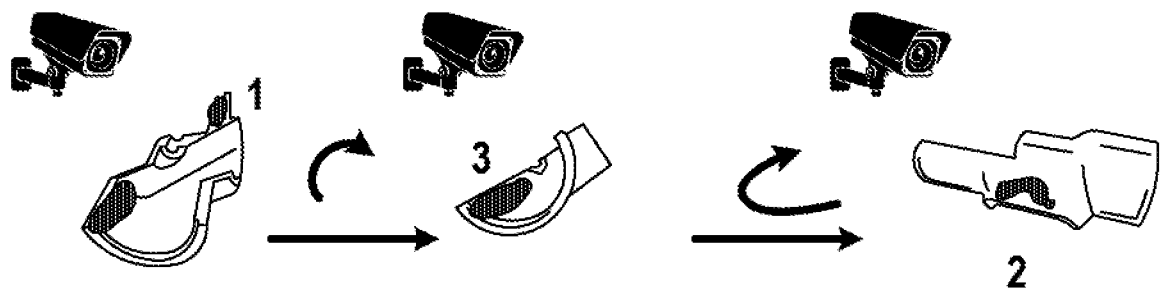
FIG. 11(C)
Part with defects:
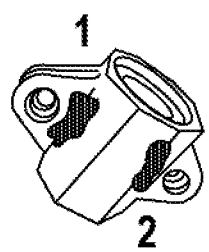
Sequence of rotations:
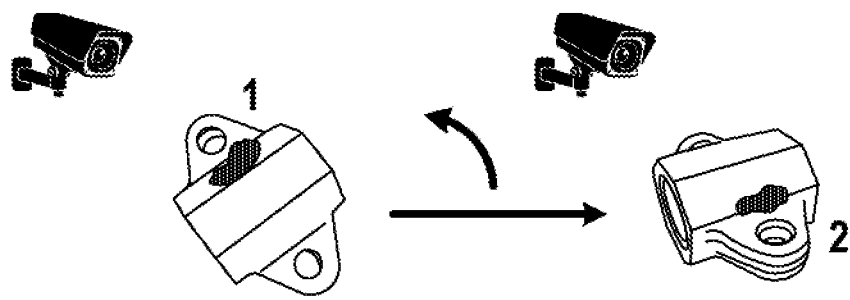
FIG. 11(D)

METHOD FOR MOTION OPTIMIZED DEFECT INSPECTION BY A ROBOTIC ARM USING PRIOR KNOWLEDGE FROM PLM AND MAINTENANCE SYSTEMS

BACKGROUND

Field

The present disclosure is generally directed to a method and a system for object defect detection.

Related Art

In an industrial setting, manufacturing parts or objects are produced in large quantities and need to be inspected for defects. This is essential in ensuring product quality and reducing operational and quality-related costs.

One of the most common quality inspection approaches involve the use of multiple cameras for capturing images of the part or object that are visible to the cameras. This often involves additional visual inspection performed by an operator of the manufacturing/production line. FIG. 1 illustrates a conventional process for defect inspection in a manufacturing/production line. As illustrated in FIG. 1, a number of cameras are used to capture images for detecting defects in parts at step 1. At step 2, an operator manually picks up the parts and performs additional visual inspection for defect detection. However, there are a few downsides to this approach. First, area of the manufactured part not visible to the cameras is not captured. Second, this often results in the generation of voluminous data (e.g. images from multiple cameras) that need to be processed to properly carry out defect inspection.

In the related art, a method to capture partial point clouds of different views of a part and merging the partial point clouds to get a mesh of the part is disclosed. The merged point cloud is then used to inspect for defects. Each partial point cloud includes a plurality of points with dimensional coordinates. The method requires acquisition and processing of voluminous data and can be computationally and time intensive when scaled to a large number of parts.

In the related art, a defect inspection system using a camera is disclosed. The system utilizes the camera to capture two-dimensional images of a part, which is then processed and inspected for defects. The method requires acquisition and processing of voluminous data in order to inspect all visible surfaces of a part. Additional steps are also required to inspect the surface of the part that is not visible to the camera when the part is on the manufacturing/production line.

A need exists for an automated defect detection method which optimizes processing time and amount of data processed/acquired in association with defect detection.

SUMMARY

Aspects of the present disclosure involve an innovative method for object defect detection. The method may include receiving an object on a production line; computing, by a processor, a motion optimized path for a robot arm, wherein the motion optimized path comprises a path for performing a sequence of rotations by the robot arm on the object for image capturing; using the robot arm to grasp the object and moving the robot arm according to the motion optimized path to rotate the object based on the sequence of rotations; capturing, by a camera, a plurality of images of the object while the object is being rotated; performing, by the processor, defect detection on the plurality of images of the object to determine object defect; and for object defect being detected, issuing, by the processor, a defect notification to an operator of the production line.

Aspects of the present disclosure involve an innovative non-transitory computer-readable medium, storing instructions for object defect detection. The instructions may include receiving an object on a production line; computing, by a processor, a motion optimized path for a robot arm, wherein the motion optimized path comprises a path for performing a sequence of rotations by the robot arm on the object for image capturing; using the robot arm to grasp the object and moving the robot arm according to the motion optimized path to rotate the object based on the sequence of rotations; capturing, by a camera, a plurality of images of the object while the object is being rotated; performing, by the processor, defect detection on the plurality of images of the object to determine object defect; and for object defect being detected, issuing, by the processor, a defect notification to an operator of the production line.

Aspects of the present disclosure involve an innovative server system for object defect detection. The system may include a production line, wherein an object is received on the production line; a robot arm; a camera, wherein the camera is used for capturing images of the object; and a processor in communication with the robot arm, the processor is configured to: compute a motion optimized path for the robot arm, wherein the motion optimized path comprises a path for performing a sequence of rotations by the robot arm on the object for image capturing; using the robot arm to grasp the object and moving the robot arm according to the motion optimized path to rotate the object based on the sequence of rotations; control the camera to capture a plurality of images of the object while the object is being rotated; perform defect detection on the plurality of images of the object to determine object defect; and for object defect being detected, issue a defect notification to an operator of the production line.

Aspects of the present disclosure involve an innovative system for object defect detection. The system may include means for receiving an object on a production line; means for computing, by a processor, a motion optimized path for a robot arm, wherein the motion optimized path comprises a path for performing a sequence of rotations by the robot arm on the object for image capturing; means for using the robot arm to grasp the object and moving the robot arm according to the motion optimized path to rotate the object based on the sequence of rotations; capturing, by a camera, a plurality of images of the object while the object is being rotated; means for performing, by the processor, defect detection on the plurality of images of the object to determine object defect; and for object defect being detected, means for issuing, by the processor, a defect notification to an operator of the production line.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 9 illustrates an example defect statistics table 900, in accordance with an example implementation.

FIGS. 11(A)-(D) illustrate example rotation sequences for parts having different shapes, in accordance with an example implementation.

DETAILED DESCRIPTION

Figure 1:
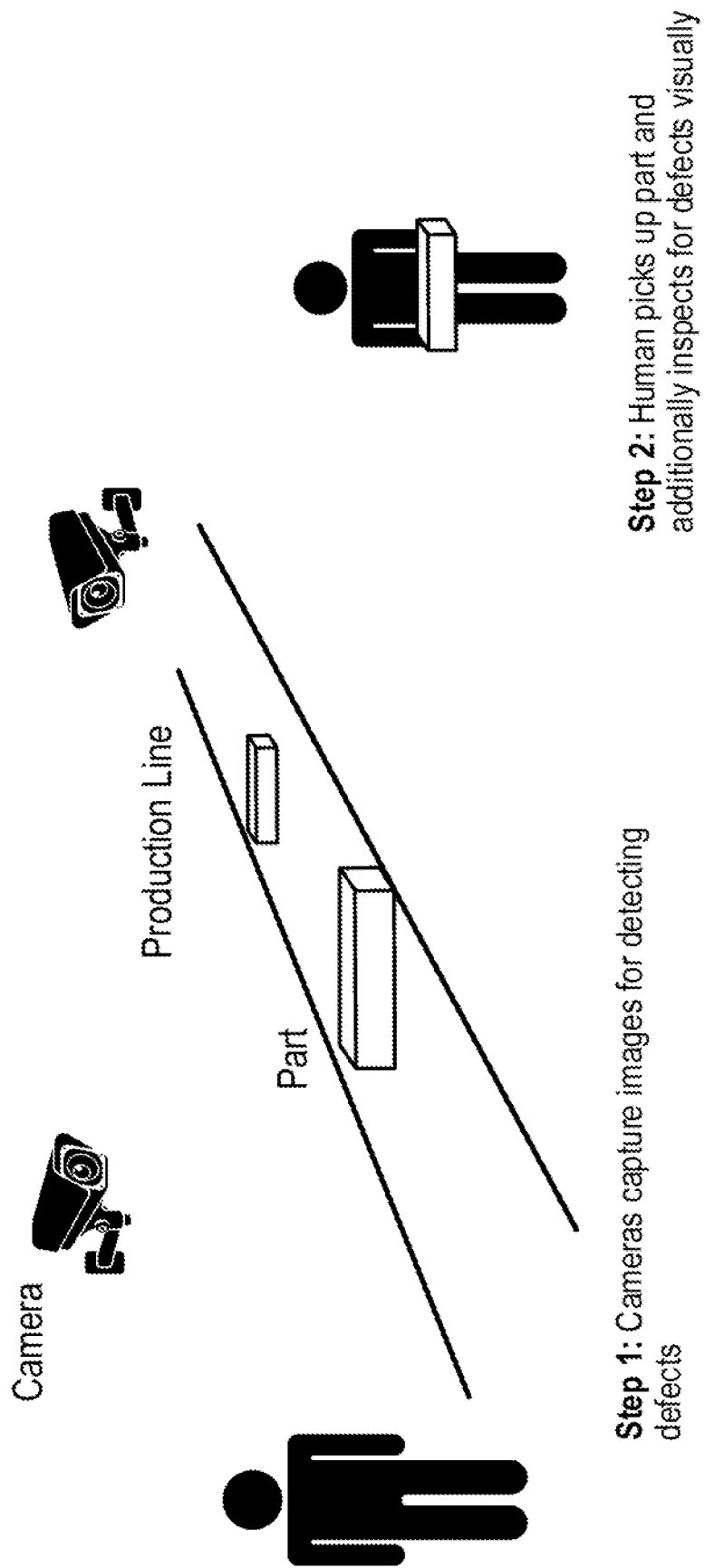
FIG. 1 illustrates a conventional process for defect inspection in a manufacturing/production line.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented through any means according to the desired implementations.

Present example implementations relate to methods and systems for object defect detection. Example implementations may include a production line, a robot arm, and a camera. The robot arm picks up a part from the production line and points it to the camera, which is mounted in a fixed position. The robot arm rotates the part in an optimized path that is derived based on the geometry of the part and the probability distribution of defects of the part. For every rotation of the arm, the camera captures an image of the part which is passed through a defect detection model to check for defect. The robot arm rotates the part to point specific areas on the part mostly prone to defects to the camera.

Figure 2:
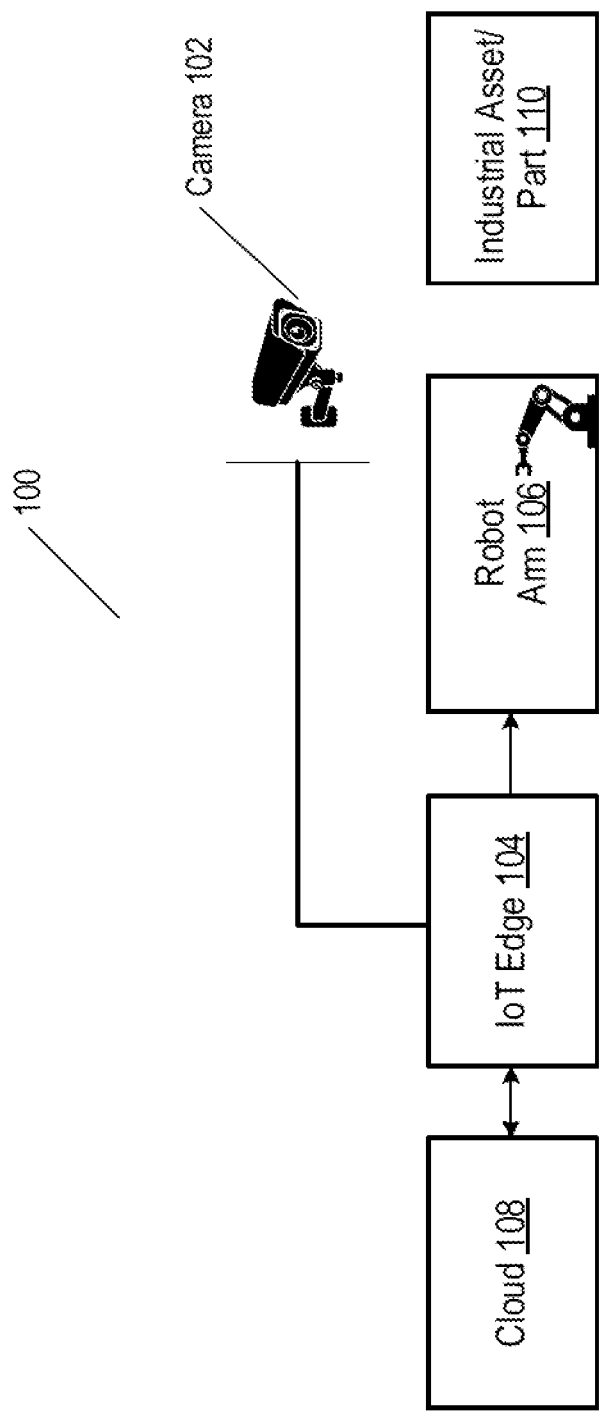
FIG. 2 illustrate an example defect detection system 100, in accordance with an example implementation.

FIG. 2 illustrate an example defect detection system 100, in accordance with an example implementation. As illustrated in FIG. 2, the defect detection system 100 may include components such as, but not limited to, a camera 102, Internet of Things (IoT) Edge 104, a robot arm 106, and cloud 108. The IoT Edge 104 is connected to and in communication with the robot arm 106 and the camera 102, both of which are used for monitoring an industrial asset/part 110. The cloud 108 may store information on the probability of defects and perform defect probability computation. The IoT Edge 104, through interactions with the cloud 108, computes the optimized path for controlling the robot arm 106.

Figure 3:
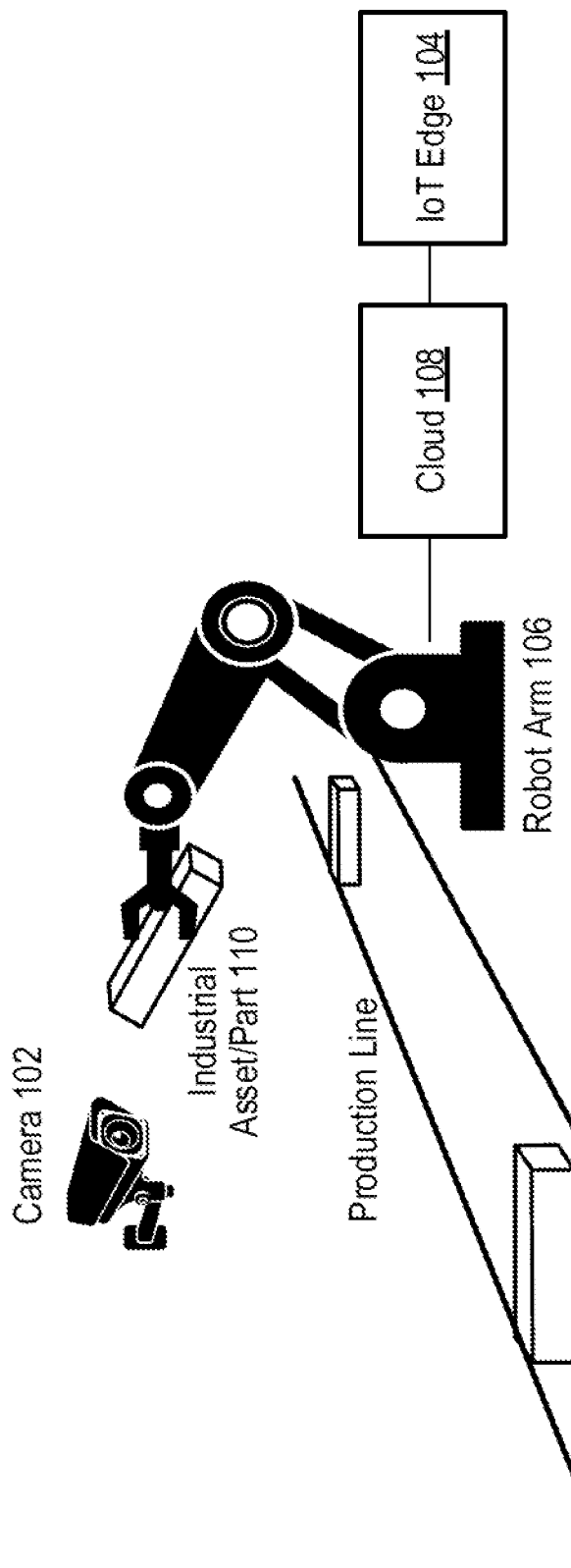
FIG. 3 illustrates operations of the example defect detection system 100 of FIG. 2, in accordance with an example implementation.

FIG. 3 illustrates operations of the example defect detection system 100 of FIG. 2, in accordance with an example implementation. The robot arm 106 picks up the industrial asset/part 110 from the production line and points it to camera 102, which is used to inspect the industrial asset/part 110 for defect.

Figure 4:
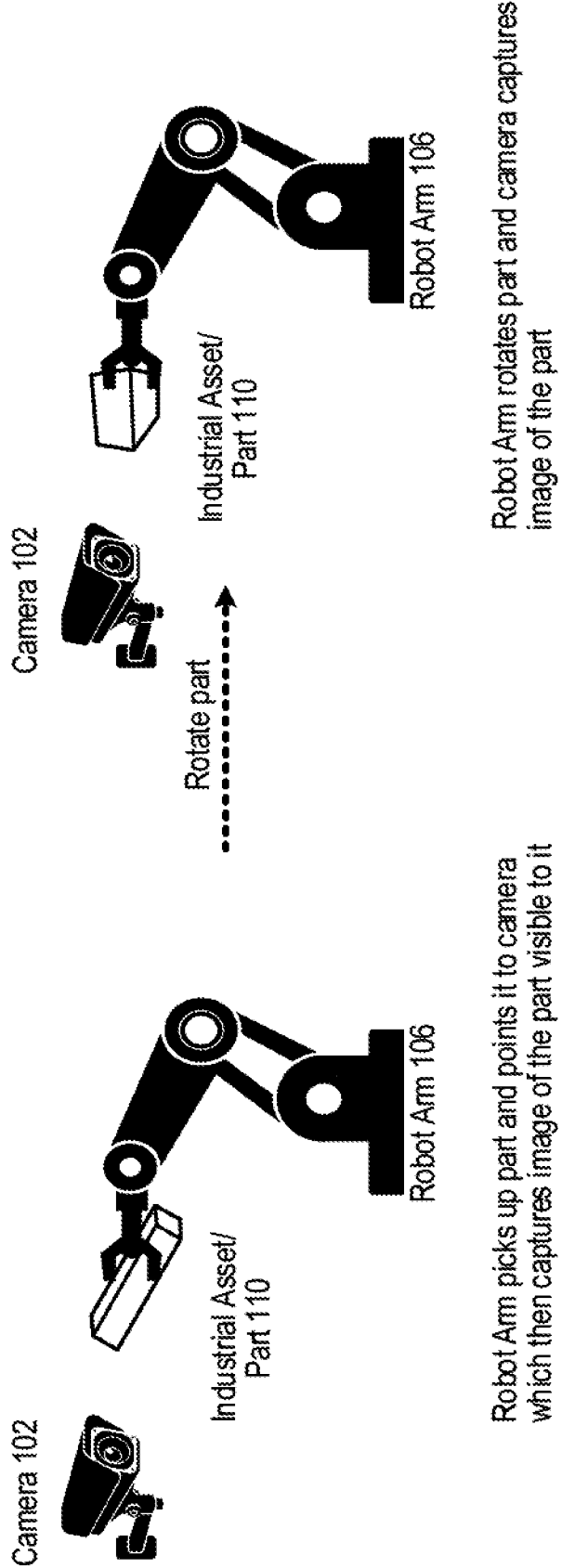
FIGS. 4(A)-(B) illustrate example rotation actions of the robot arm 106, in accordance with an example implementation.

FIGS. 4(A)-(B) illustrate example rotation actions of the robot arm 106, in accordance with an example implementation. As illustrated in FIG. 4(A), the robot arm 106 picks up the industrial asset/part 110 and points it towards the camera 102 to allow the camera 102 to capture a first image of the industrial asset/part 110. As illustrated in FIG. 4(B), the robot arm 106 then rotates the industrial asset/part 110 based on a subsequent action sequence of the optimized path, and points it towards the camera 102 to allow the camera 102 to capture subsequent image of the industrial asset/part 110.

Figure 5:
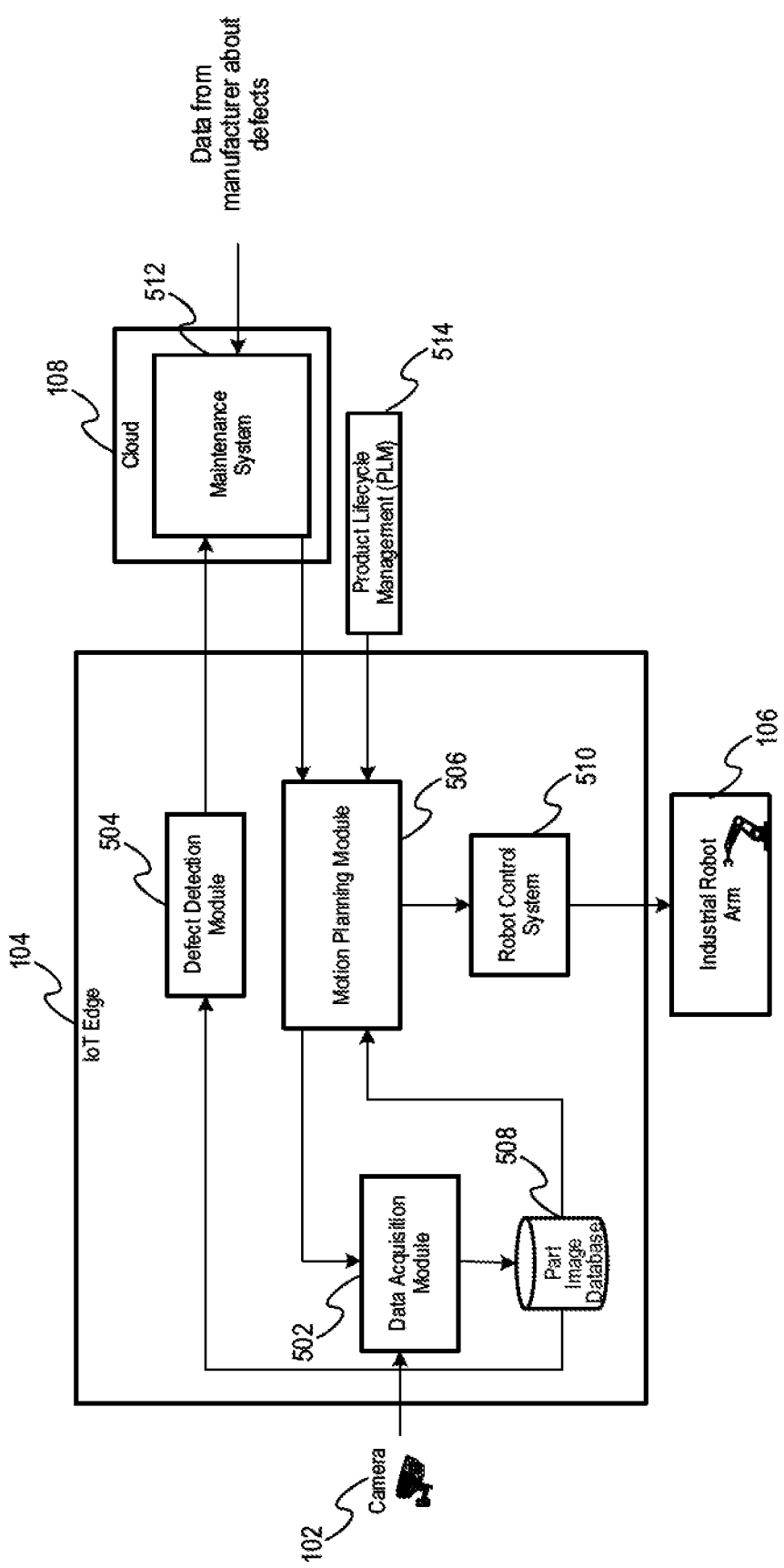
FIG. 5 illustrates an example component block diagram of defect detection system 100, in accordance with an example implementation.

FIG. 5 illustrates an example component block diagram of defect detection system 100, in accordance with an example implementation. As shown in FIG. 5, the IoT Edge 104 may include components such as, but not limited to, data acquisition module 502, defect detection module 504, motion planning module 506, part image database 508, and robot control system 510. Cloud 108 may include a maintenance system 512.

Data acquisition module 502 interfaces with the camera 102 to capture images of the industrial asset/part 110 and then sends them to the part image database 508 for further processing. The motion planning module 506 plans the sequence of rotations for the robot arm 106 in an optimized motion path, and takes the following inputs: (a) geometry of the part/computer-aided design (CAD) drawing from the product line management (PLM) 514, and (b) probability distribution of defects from the maintenance system 512. The probability distribution of defects of an object estimates probability of defect development on the object.

Defect detection module 504 takes in an image of the part as input and outputs the location and bounding box of the defect. This module can be implemented in a number of ways, with one method being a machine learning model trained offline on data to detect defects on the parts. Maintenance system 512 processes information such as history about the probability of defects on the part from the manufacturer as well as the output of the defect detection module 504, and maintains a record of the probability distribution of the defects on the asset/part.

Robot control system 510 takes as input the sequence of motion from the motion planning module 506 and translates them to control signals to move/rotate the joints of the robot arm 106.

Figure 6:
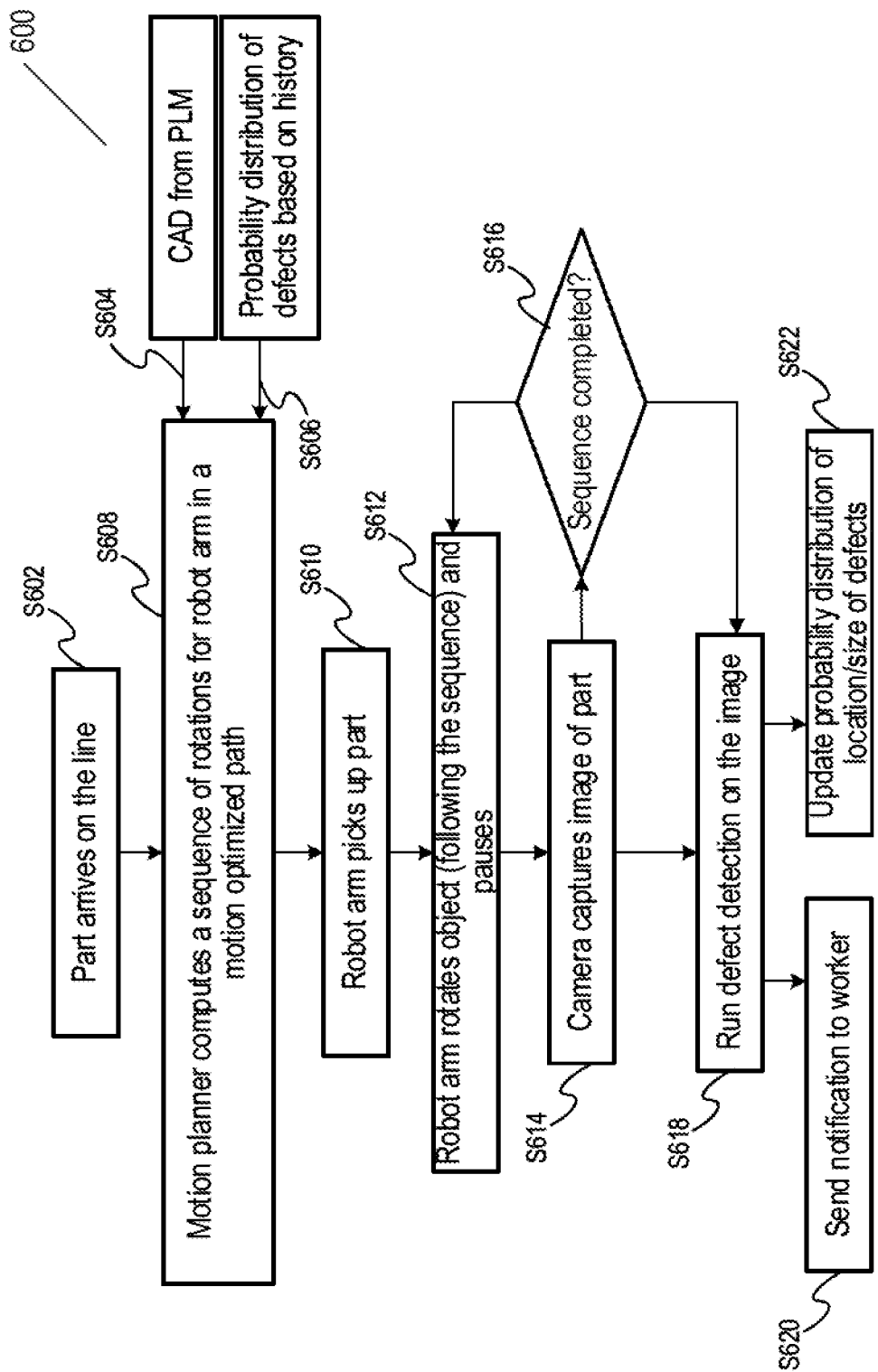
FIG. 6 illustrates an example process flow 600 of defect detection using the defect detection system 100, in accordance with an example implementation.

FIG. 6 illustrates an example process flow 600 of defect detection using the defect detection system 100, in accordance with an example implementation. The process begins at step S602 where part arrives on the production line. Information about the part is known prior to the part's arrival on the production line and retrieved. At step S604, information regarding the geometry of the part or CAD is retrieved from the PLM 514. At step S606, the probability distribution of the defects for the part is retrieved from the maintenance system 512. Using the information received at step S604 and S606 as inputs, the motion planning module 506 computes the sequence of rotations for the robot arm 106 in a motion optimized path at step S608.

At step S610, the robot arm 106 picks up the part. The process then continues to step S612 where the robot arm 106 rotates the part and pauses. At step S614, the camera 102 captures the image of the part. When the robot arm 106 pauses, the camera 102 receives a signal to capture an image of the part. At step S616, a determination is made as to whether the sequence of rotations for the robot arm 106 has been completed. If the answer is no, then the process returns to step S612, where the robot arm 106 continues with part rotation. If the answer is yes, then the process continues to step S618 where defect detection is performed on the acquired image(s).

If a defect is detected in the image(s), a notification is sent to the operator at step S620. Based on the defect detected, the probability distribution of the location/size of the defects is updated at step S622.

Figure 7:
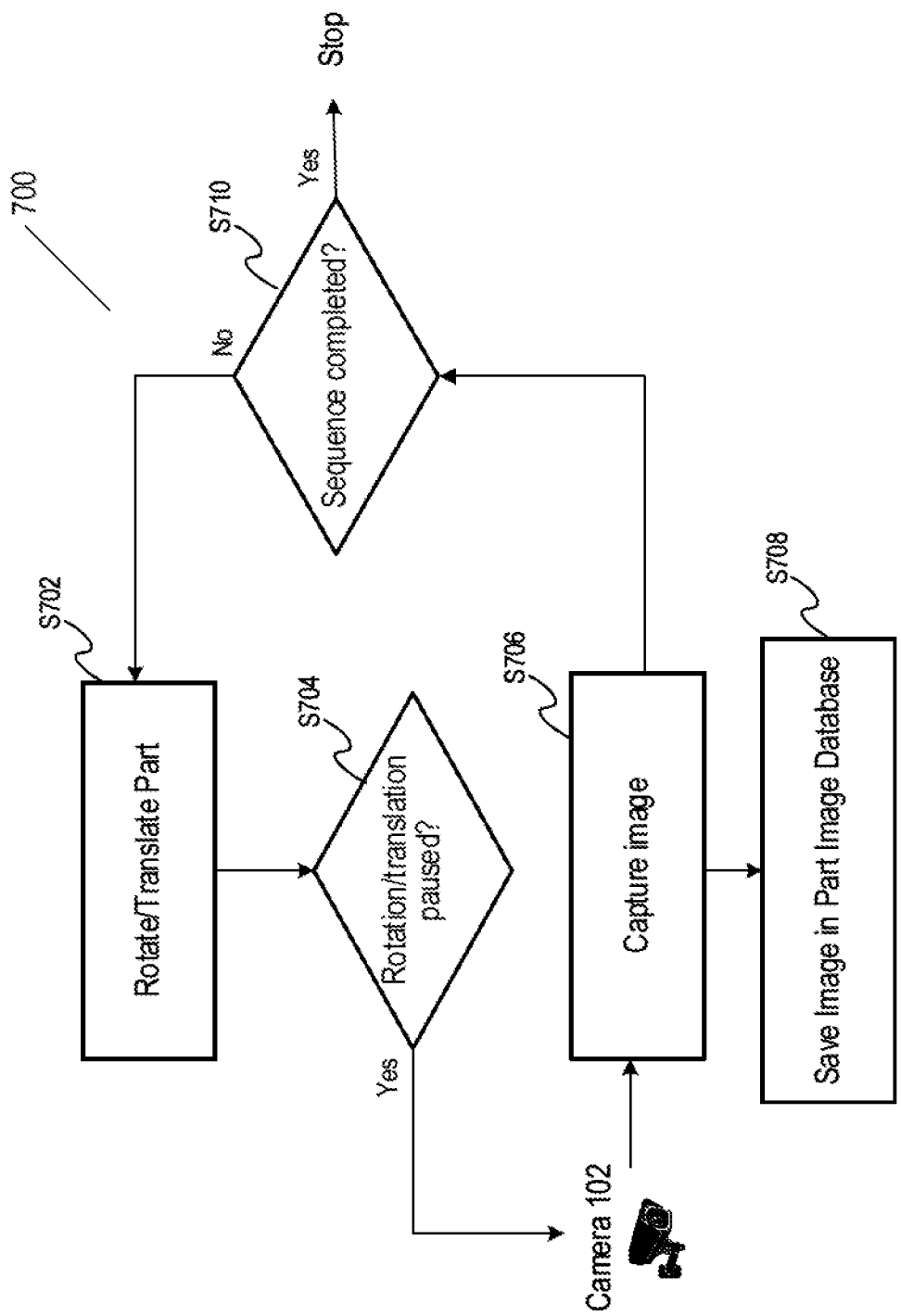
FIG. 7 illustrates an example process flow 700 of image capturing and storing, in accordance with an example implementation.

FIG. 7 illustrates an example process flow 700 of image capturing and storing, in accordance with an example implementation. The process begins at step S702 where the industrial asset/part 110 is rotated/translated while being held/grasped by the robot arm 106. On completion of the initial rotation/translation, the robot arm 106 performs a pausing action, where the robot arm pauses for a predetermined period of time. At step S704, a determination is made as to whether rotation/translation has paused, indicating completion of the initial rotation/translation. If the answer is yes, then a signal is transmitted from the data acquisition module 502 to the camera 102 which triggers image capturing at step S706.

The process then continues to steps S708 and S710. At step S708, the captured image is stored in the part image database 508. Once the image is captured, a determination is made as to whether the sequence is complete at step S710. If the answer is no, then the process returns to step S702 where subsequent rotation/translation of the industrial asset/part 110 by the robot arm 106 in the sequence of rotations is performed. On the other hand, if the answer is yes at step S710, then the process comes to an end.

Figure 8:
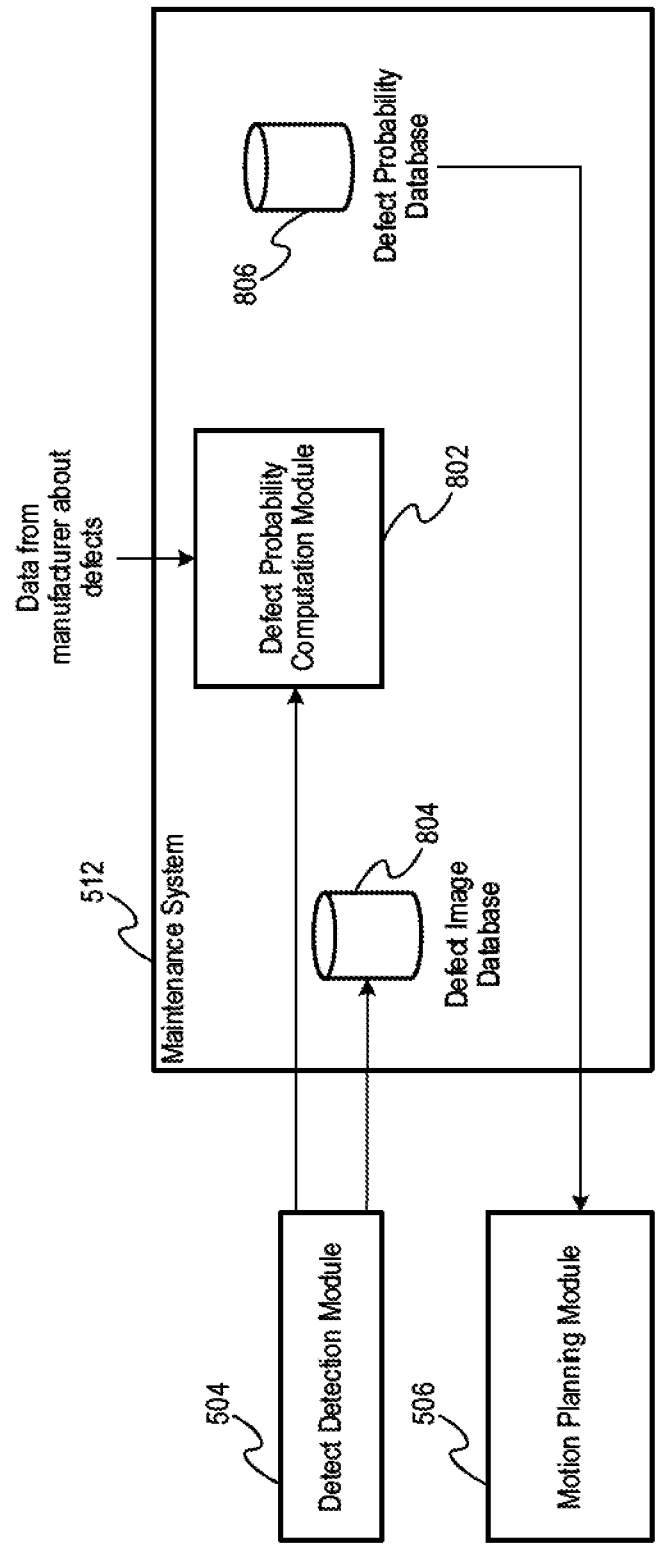
FIG. 8 illustrates an example maintenance system 512, in accordance with an example implementation.

FIG. 8 illustrates an example maintenance system 512, in accordance with an example implementation. As illustrated in FIG. 8, the maintenance system 512 may include components such as, but not limited to, a defect probability computation module 802, a defect image database 804, and a defect probability database 806. The defect detection module 504 performs defect detection on the images acquired and sends the images containing defects to the defect image database 804 for storage. In some example implementations, images and data retained in the defect image database can be further utilized in training the defect detection module 504 when the defect detection module 504 is a machine learning model.

The defect probability computation module 802 computes the probability distribution of defects by combining historical object defect detection information and information/data from the manufacturer concerning asset/part's defects and the defect attributes as generated from the defect detection module 504. The computed probability distribution is then stored in the defect probability database 806 and provided as input to the motion planning module 506 to control the robot arm 106 and the camera 102.

FIG. 9 illustrates an example defect statistics table 900, in accordance with an example implementation. The defect statistics table 900 is stored in the defect probability database 806 illustrated in FIG. 8. As illustrated in FIG. 9, the defect statistics table 900 may include information such as, but not limited to, part identifier (ID) 902, defect ID 904, bounding box coordinates 906, centroid 908, spread 910, and probability 912.

Each identified asset/part has a corresponding identifier under part ID 902. Each defect associated with an identified asset/part has a corresponding identifier under the column of defect ID 904. For example, for the asset/part identified as "1" under part ID 902, three different defects have been identified and each having a corresponding identifier under defect ID 904.

Information associated with an identified defect are stored under bounding box coordinates 906, centroid 908, spread 910, and probability 912. Bounding box coordinates 906 provide precise coordinates of the defect. In some example implementations, the coordinates are in the form of dimensional axis. In other example implementations, the coordinates are represented by a combination of dimensional axis and dimensional measurements. For example, coordinates may be represented by a combination of directional axis in which the defect exists, height of the defect, and width of the defect. Centroid 908 represents the geometric center of defects, spread 910 represents area of impact of the defects, while probability 912 represents probability of defect occurrence.

Figure 10:
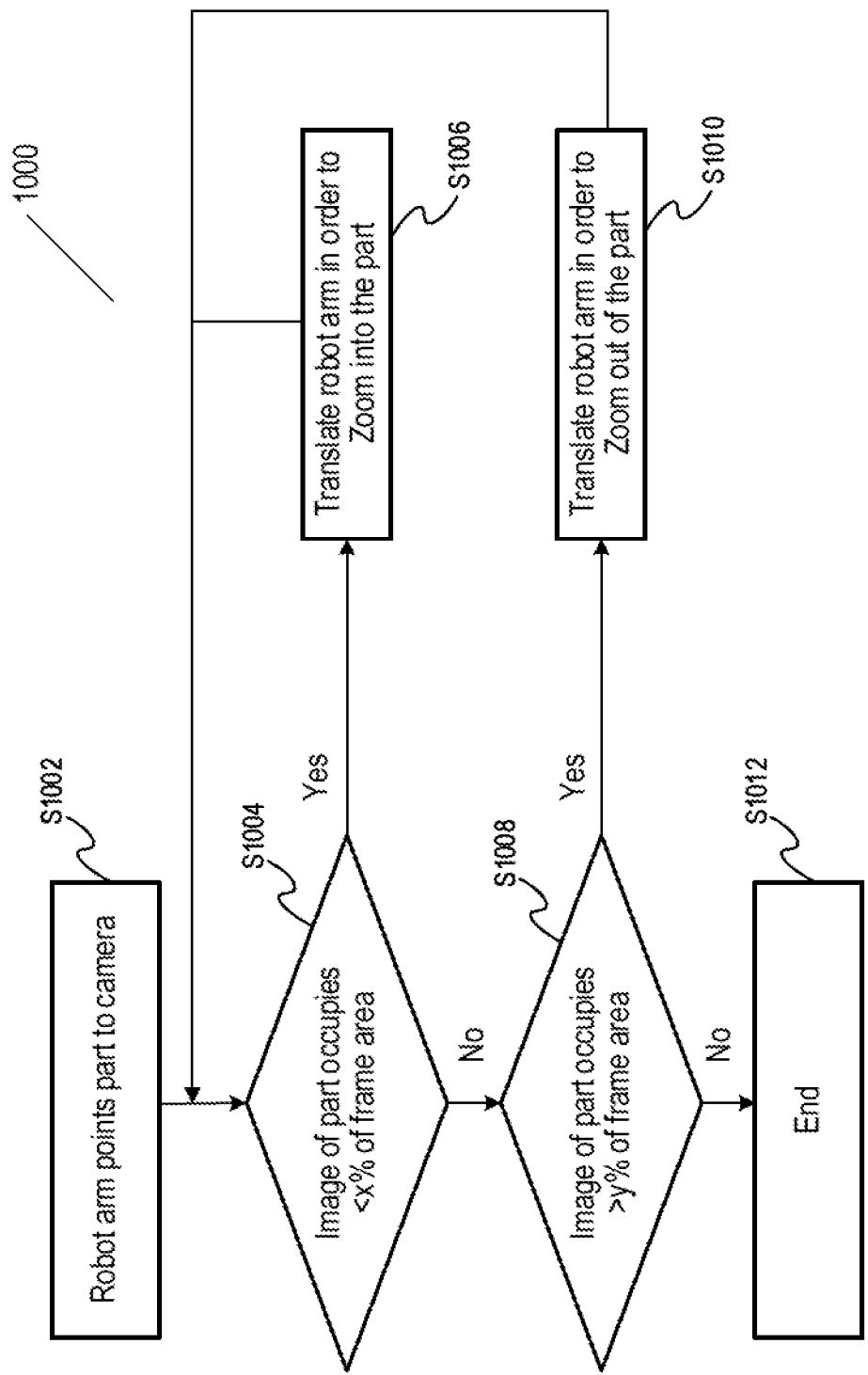
FIG. 10 illustrates an example process flow 1000 of translation computation, in accordance with an example implementation.

FIG. 10 illustrates an example process flow 1000 of translation computation, in accordance with an example implementation. The translation computation is performed by the motion planning module 506. The process begins at step S1002 where the robot arm 106 grasps the industrial asset/part 110 and point it toward the camera 102. At step S1004, a determination is made as to whether image of the industrial asset/part 110 occupies less than x % (first threshold) of the camera 102's frame area. If the answer is no at step S1004, then the process proceeds to step S1008. If the answer is yes, then the process proceeds to step S1006 where the robot arm 106 is translated in order to allow the part to be zoomed in. The process then returns to step S1004 for further evaluation/determination.

At step S1008, a determination is made as to whether the image of the industrial asset/part 110 occupies more than y % (second threshold) of the camera 102's frame area. If the answer is no at step S1008, then the process proceeds to step S1012 where the process comes to an end. If the answer is yes, then the process proceeds to step S1010 where the robot arm 106 is translated in order to allow the part to be zoomed out. The process then returns to step S1004 for further evaluation/determination. In some example implementations, the first threshold and the second threshold are preset, and can be adjusted according to varying sizes of different industrial assets/parts 110.

In some example implementations, a rotation computation module within the motion planning module 506, not illustrated, can be implemented as a machine learning/artificial intelligence (AI) model that is trained to solve the optimization problem. The rotation computation module may receive information such as geometry of the industrial asset/part 110 and probability distribution of defects on the industrial asset/part 110 as input in generating the optimized paths for the robot arm 106.

FIGS. 11(A)-(D) illustrate example rotation sequences for parts having different shapes, in accordance with an example implementation. The motion planning module 506 computes the minimum number of rotations and an optimized path for rotating the parts. Optimized paths for inspecting symmetrical parts such as cube and sphere are illustrated in FIGS. 11(A)-(B). Optimized paths for inspecting asymmetrical parts are illustrated in FIGS. 11(C)-(D).

For symmetrical parts such as cube and sphere, the motion planning module 506 computes the minimum number of rotations to inspect the part based on the geometry itself. Taking the cube as example, six rotations would be needed to completely capture the six faces/sides of the cube. For a sphere, two rotations would be needed to completely capture the two hemispherical surfaces of the sphere. For an asymmetrical part as shown in FIG. 11(C), three rotations would be needed to completely capture surfaces/sides of the part. For an asymmetrical part as shown in FIG. 11(D), two rotations would be needed to completely capture surfaces/sides of the part.

The foregoing example implementation may have various benefits and advantages. For example, example implementations reduce the time and effort taken to inspect a manufacturing part. By prioritizing inspection of the areas on the part with higher probability of defects rather than processing a larger number of images taken to capture all surfaces of the part, the amount of data processed for part inspection is significantly reduced.

Figure 12:
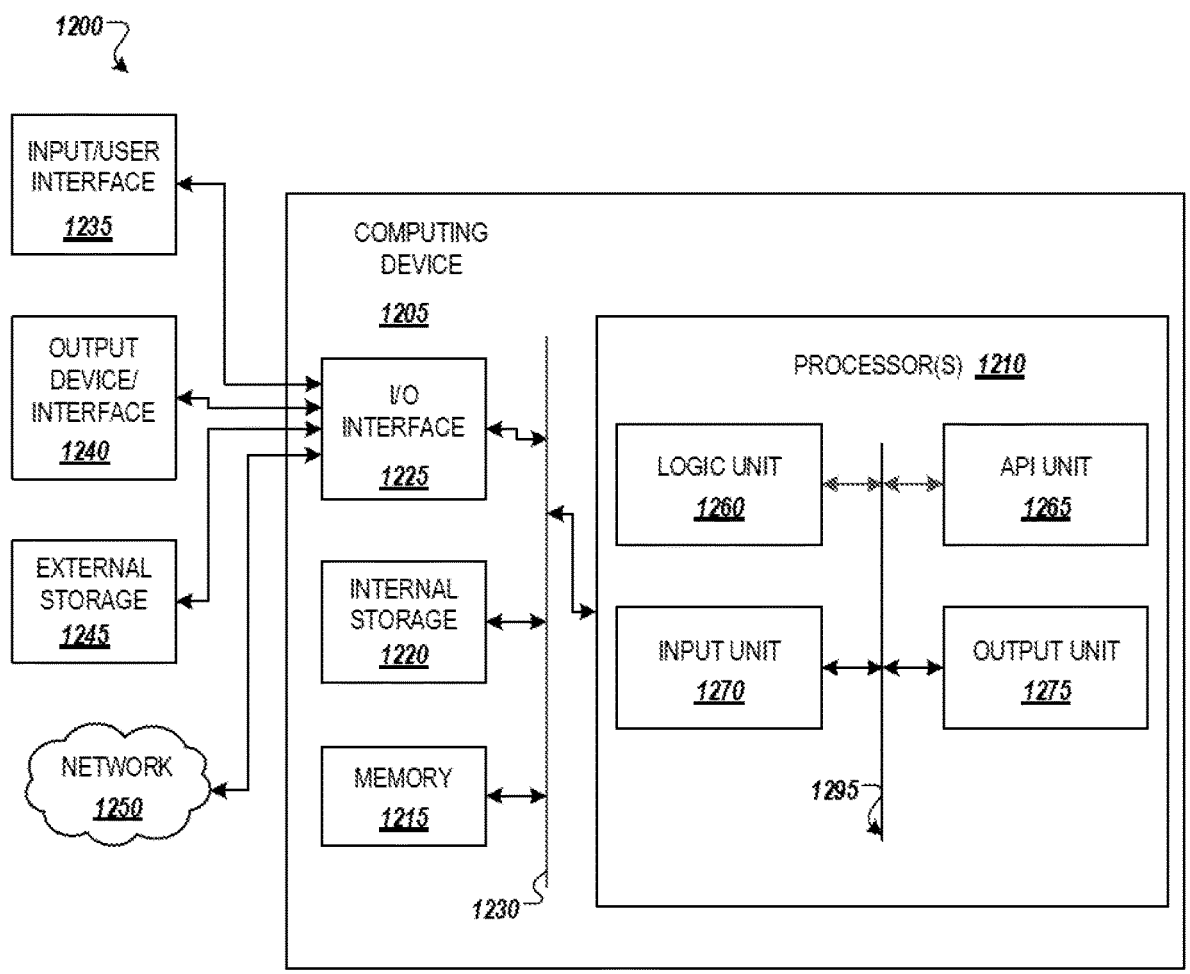
FIG. 12 illustrates an example computing environment with an example computing device suitable for use in some example implementations.

FIG. 12 illustrates an example computing environment with an example computer device suitable for use in some example implementations. Computer device 1205 in computing environment 1200 can include one or more processing units, cores, or processors 1210, memory 1215 (e.g., RAM, ROM, and/or the like), internal storage 1220 (e.g., magnetic, optical, solid-state storage, and/or organic), and/or IO interface 1225, any of which can be coupled on a communication mechanism or bus 1230 for communicating information or embedded in the computer device 1205. IO interface 1225 is also configured to receive images from cameras or provide images to projectors or displays, depending on the desired implementation.

Computer device 1205 can be communicatively coupled to input/user interface 1235 and output device/interface 1240. Either one or both of the input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via IO interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

IO interface 1225 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs) or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, the input unit 1270, the output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide an output based on the calculations described in example implementations.

Processor(s) 1210 can be configured to receive an object on a production line as shown in FIG. 6. The processor(s) 1210 may also be configured to compute a motion optimized path for a robot arm, wherein the motion optimized path comprises a path for performing a sequence of rotations by the robot arm on the object for image capturing as shown in FIG. 6. The processor(s) 1210 may also be configured to use the robot arm to grasp the object and moving the robot arm according to the motion optimized path to rotate the object based on the sequence of rotations as shown in FIG. 6. The processor(s) 1210 may also be configured to capture, by a camera, a plurality of images of the object while the object is being rotated as shown in FIG. 6. The processor(s) 1210 may also be configured to perform defect detection on the plurality of images of the object to determine object defect as shown in FIG. 6. The processor(s) 1210 may also be configured to, for object defect being detected, issue a defect notification to an operator of the production line as shown in FIG. 6.

The processor(s) 1210 may also be configured to, for object defect being detected, update the probability distribution of defects for the object based on the detected object defect as shown in FIG. 6. The processor(s) 1210 may also be configured to for an image of the plurality of images occupying less than a first predetermined percentage of camera frame area, translate, by the robot arm, the object towards the camera and performing image recapturing of the object as shown in FIG. 10. The processor(s) 1210 may also be configured to, for an image of the plurality of images occupying more than a second predetermined percentage of camera frame area, translate, by the robot arm, the object away from the camera and performing image recapturing of the object as shown in FIG. 10.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for object defect detection, the method comprising:
    receiving an object on a production line;
    computing, by a processor, a motion optimized path for a robot arm, wherein the motion optimized path comprises a path for performing a sequence of rotations by the robot arm on the object for image capturing;
    using the robot arm to grasp the object and moving the robot aim according to the motion optimized path to rotate the object based on the sequence of rotations;
    capturing, by a camera, a plurality of images of the object while the object is being rotated;
    performing, by the processor, defect detection on the plurality of images of the object to determine object defect; and
    for object defect being detected, issuing, by the processor, a defect notification to an operator of the production line,
    wherein computing the motion optimized path for the robot arm comprises;
    receiving, by the processor, geometric information of the object;

receiving, by the processor, probability distribution of defects for the object, the probability distribution of defects for the object estimates probability of defect development on the object during production; and computing, by the processor, the motion optimized path for the robot arm based on the geometric information and the probability distribution of defects.

2. The method of claim 1, further comprising:

for object defect being detected, updating, by the processor, the probability distribution of defects for the object based on the detected object defect.

3. The method of claim 1, wherein the probability distribution of defects for the object is derived by combining defect information from object manufacturer and historical object defect detection information.

4. The method of claim 1, wherein the geometric information comprises computer-aided design (CAD).

5. The method of claim 1, wherein defect detection is performed using a machine learning model for defect detection.

6. The method of claim 1, wherein capturing the plurality of images of the object while the object is being rotated comprises:

for completing each rotation of the sequence of rotations, pausing the robot arm for a predetermined period of time before initiating a subsequent rotation and capturing image of the object during each pause until the sequence of rotations is completed by the robot arm.

7. The method of claim 1, further comprising:

for an image of the plurality of images occupying less than a first predetermined percentage of camera frame area, translating, by the robot arm, the object towards the camera and performing image recapturing of the object; and for an image of the plurality of images occupying more than a second predetermined percentage of camera frame area, translating, by the robot arm, the object away from the camera and performing image recapturing of the object.

8. The method of claim 1, wherein the sequence of rotations is determined based on shape of the object.

9. A system for object defect detection, the system comprising:

a production line, wherein an object is received on the production line;

a robot arm;

a camera, wherein the camera is used for capturing images of the object; and a processor in communication with the robot arm, the processor is configured to:

compute a motion optimized path for the robot arm, wherein the motion optimized path comprises a path for performing a sequence of rotations by the robot arm on the object for image capturing;

using the robot arm to grasp the object and moving the robot arm according to the motion optimized path to rotate the object based on the sequence of rotations;

control the camera to capture a plurality of images of the object while the object is being rotated;

perform defect detection on the plurality of images of the object to determine object defect; and for object defect being detected, issue a defect notification to an operator of the production line, wherein computing the motion optimized path for the robot arm comprises:

receive geometric information of the object;

receive probability distribution of defects for the object, the probability distribution of defects for the object estimates probability of defect development on the object during production; and compute the motion optimized path for the robot arm based on the geometric information and the probability distribution of defects.

10. The system of claim 9, further comprising:

for object defect being detected, the processor is further configured to update the probability distribution of defects for the object based on the detected object defect.

11. The system of claim 9, wherein the probability distribution of defects for the object is derived through the processor being further configured to combine defect information from object manufacturer and historical object defect detection information.

12. The system of claim 9, wherein the geometric information comprises computer-aided design (CAD).

13. The system of claim 9, wherein defect detection is performed using a machine learning model for defect detection.

14. The system of claim 9, wherein capture the plurality of images of the object while the object is being rotated comprises:

for completing each rotation of the sequence of rotations, pause the robot arm for a predetermined period of time before a subsequent rotation is initiated; and capture image of the object during each pause until the sequence of rotations is completed by the robot arm.

15. The system of claim 9, further comprising:

for an image of the plurality of images occupying less than a first predetermined percentage of camera frame area, translate, by the robot arm, the object towards the camera and perform image recapturing of the object; and for an image of the plurality of images occupying more than a second predetermined percentage of camera frame area, translate, by the robot arm, the object away from the camera and perform image recapturing of the object.

16. The system of claim 9, wherein the sequence of rotations is determined based on shape of the object.

17. The method of claim 1, further comprising:

wherein the sequence of rotations comprises a minimum number of rotations by the robot arm based on a shape of the object in order for full image capturing to be performed.

* * * * *